(12) United States Patent
Leeman

(10) Patent No.: US 12,532,797 B1
(45) Date of Patent: Jan. 27, 2026

(54) EQUIPMENT STORAGE DEVICE FOR A BOX BLADE

(71) Applicant: Rick Leeman, Novar (CA)

(72) Inventor: Rick Leeman, Novar (CA)

(73) Assignee: Rick Leeman

( * ) Notice: Subject to any disclaimer, the term of this patent is extended or adjusted under 35 U.S.C. 154(b) by 0 days.

(21) Appl. No.: 19/310,942

(22) Filed: Aug. 27, 2025

(51) Int. Cl.
*A01B 76/00* (2006.01)
*A01B 35/14* (2006.01)

(52) U.S. Cl.
CPC .............. *A01B 76/00* (2013.01); *A01B 35/14* (2013.01)

(58) Field of Classification Search
CPC ....... A01B 76/00; A01B 59/043; A01B 63/10; B60R 11/06
See application file for complete search history.

(56) References Cited

U.S. PATENT DOCUMENTS

| | | | | |
|---|---|---|---|---|
| 2,784,027 A | * | 3/1957 | Temp | B60P 3/32 296/156 |
| 5,853,116 A | * | 12/1998 | Schreiner | B60R 9/00 224/404 |
| 6,502,654 B2 | | 1/2003 | Witte et al. | |
| 6,513,690 B1 | * | 2/2003 | Churchill | B60R 9/06 224/523 |
| 6,698,786 B2 | | 3/2004 | Witte et al. | |
| 7,204,397 B2 | | 4/2007 | Powell et al. | |
| 8,083,111 B2 | | 12/2011 | Lase | |
| 8,820,598 B2 | * | 9/2014 | Tennyson | B60R 9/065 224/532 |
| 9,180,820 B2 | * | 11/2015 | Klein | B60R 9/06 |
| 9,308,947 B2 | * | 4/2016 | Kmita | B60R 11/06 |
| 9,783,129 B2 | | 10/2017 | Roach et al. | |
| 10,029,598 B2 | * | 7/2018 | Keck | B60R 9/06 |
| 10,106,099 B1 | | 10/2018 | Mcloughlin | |
| 10,974,656 B2 | * | 4/2021 | Keck | B60R 9/065 |
| 11,034,282 B2 | | 6/2021 | Barlow | |
| 11,760,425 B2 | * | 9/2023 | Adams, Jr. | B60R 9/065 224/404 |
| 11,991,942 B2 | * | 5/2024 | Chrysanthakopoulos | A01B 59/066 |
| 2008/0041904 A1 | | 2/2008 | Price et al. | |
| 2009/0056592 A1 | * | 3/2009 | Threet | B60R 9/06 108/11 |

(Continued)

FOREIGN PATENT DOCUMENTS

CA 3091802 A1 2/2021

*Primary Examiner* — Brian D Nash
(74) *Attorney, Agent, or Firm* — Argus Intellectual Enterprise, LLC; Jordan Sworen; Daniel Enea

(57) ABSTRACT

An equipment storage device for a box blade is provided. The equipment storage device includes a storage container having a base, a rear wall, a front wall, and opposing sidewalls, with a plurality of dividing walls defining internal compartments for retaining equipment. A mounting interface is capable of securing the storage container to a mounting surface, such as a box blade implement attached to a tractor. The front wall partially encloses a front portion of the storage container, and a channel is formed through an upper portion of the front wall. The channel can receive an end of a tool therethrough, such as a blade of a chainsaw. The device provides convenient and secure access to tools and equipment during field operations, eliminating the need for separate storage or transportation arrangements and increasing efficiency for tractor operators.

18 Claims, 4 Drawing Sheets

(56) References Cited

U.S. PATENT DOCUMENTS

| | | | | |
|---|---|---|---|---|
| 2010/0206929 A1* | 8/2010 | Perry | ............... | B60R 9/065 |
| | | | | 224/527 |
| 2012/0261450 A1* | 10/2012 | Moore | ............... | B25H 3/02 |
| | | | | 224/404 |
| 2012/0325877 A1* | 12/2012 | Franks | ............... | B60R 11/06 |
| | | | | 224/404 |
| 2013/0292145 A1* | 11/2013 | Pastour | ............... | A01B 45/026 |
| | | | | 172/22 |
| 2017/0290258 A1* | 10/2017 | Mollick | ............... | A01B 63/023 |
| 2022/0053683 A1 | 2/2022 | Bucknell | | |

* cited by examiner

EQUIPMENT STORAGE DEVICE FOR A BOX BLADE

BACKGROUND OF THE INVENTION

The present invention relates generally to equipment used in conjunction with agricultural and industrial tractors. More specifically, the present invention pertains to an equipment storage device configured to be secured to a box blade implement, enabling organized, accessible, and secure transport of tools and supplies during field operations.

Utility tractors are widely used across residential, agricultural, and commercial applications for tasks such as grading, hauling, and field maintenance. Many of these tractors are equipped with rear-mounted implements like box blades, which are commonly used for leveling soil or moving gravel. While these attachments serve vital operational purposes, they do not address a persistent logistical challenge faced by operators. There is no integrated system for carrying tools, supplies, or service equipment while operating the tractor in the field. As a result, users are often forced to place items in the front loader bucket or leave necessary gear behind, which disrupts workflow, increases downtime, and introduces unnecessary safety risks due to cluttered or insecure equipment placement.

Several accessory products have been developed in an attempt to address this issue, but each exhibits notable shortcomings. For example, certain commercial tractor caddy units are available that mount to the 3-point hitch of a tractor. These products are costly, bulky, and mechanically complicated, often requiring full removal when switching to other implements. This adds time and inconvenience, and in many cases, necessitates additional handling or storage arrangements for the detached caddy. Other solutions involve shelf systems that mount on the Roll Over Protection Structure (ROPS) of the tractor, but these are typically positioned too high for easy access from ground level. Their limited size restricts storage capacity, and the elevated mounting can pose hazards or interfere with other mounted accessories or rear implements. Additionally, some ROPS-mounted products only accommodate single-purpose tools such as chainsaws but lack compartments for accompanying necessities like gas, oil, and maintenance gear, thereby limiting their utility in real-world conditions.

Moreover, none of the available solutions offer multi-functional performance. For instance, tractor owners often invest in a ballast box to counterbalance loads on the front loader and prevent tipping. Yet most storage accessories do not integrate ballast functionality, resulting in separate purchases and installation processes, further reducing cost efficiency and operational simplicity.

The need therefore exists for a compact, accessible, and multi-use storage solution that integrates seamlessly with commonly used implements, particularly the box blade. The present invention addresses these deficiencies by introducing a modular storage unit that mounts directly atop an existing box blade via a simple bolting mechanism. This configuration takes advantage of an underutilized surface on the tractor's rear attachment, offering an ergonomic storage space at waist height. The present invention allows users to transport tools, fuel, chains, protective gear, or personal items securely and without compromising the function of the tractor or other attachments. Unlike prior art, it remains mounted during normal operation, minimizes the need for auxiliary ballast equipment, and requires no climbing or reaching to access stored contents.

In light of the devices disclosed in the known art, it is submitted that the present invention substantially diverges in design elements and methods from the known art and consequently it is clear that there is a need in the art for an equipment storage device for a box blade. In this regard the instant invention substantially fulfills these needs.

SUMMARY OF THE INVENTION

In view of the foregoing disadvantages inherent in the known types of equipment storage devices now present in the known art, the present invention provides a new equipment storage device for providing convenient and secure access to tools and equipment during field operations, eliminating the need for separate storage or transportation arrangements and increasing efficiency for tractor operators.

It is an objective of the present invention to provide an equipment storage device for a box blade comprising a storage container with multiple internal compartments, allowing users to organize and transport essential gear without occupying the tractor's front loader or cab. This configuration eliminates the need for repeated trips to retrieve equipment, thereby improving field efficiency and operator workflow.

It is an objective of the present invention to provide an equipment storage device that is configured to attach directly to the upper surface of a box blade implement. By utilizing the existing structure of the box blade as a mounting platform, the device avoids interference with other tractor functions and does not require modification to the tractor itself. This mounting approach simplifies installation and allows the storage device to remain fixed during operation.

It is an objective of the present invention to provide an equipment storage device having a channel disposed through the upper portion of a front wall, the channel being configured to receive the blade of a chainsaw or other elongated tool. This allows for secure vertical storage of such tools in a downward-facing orientation, preventing damage during transit and ensuring quick access when needed. The channel placement reduces the likelihood of tool interference with other compartments.

It is an objective of the present invention to provide an equipment storage device with a ballast function to improve tractor stability. The storage container may include a ballast chamber that can be selectively filled with material to act as a counterweight during front-end loading. This dual-purpose functionality reduces the need for a separate ballast box and maximizes use of available implement space.

It is an objective of the present invention to provide an equipment storage device constructed from weather-resistant materials such as powder-coated steel, aluminum, or high-density polyethylene. The use of durable materials protects stored tools and equipment from environmental degradation and extends the operational lifespan of the device. The construction also supports field use under varying weather conditions.

It is an objective of the present invention to provide an equipment storage device that includes optional posts and fasteners for securing elongated tools externally. These posts may be mounted to the container via brackets and configured to hold additional tools such as rakes, shovels, or poles. This external storage capability expands the device's carrying capacity while maintaining compartmental organization within the container.

It is therefore an object of the present invention to provide a new and improved equipment storage device for a box blade that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
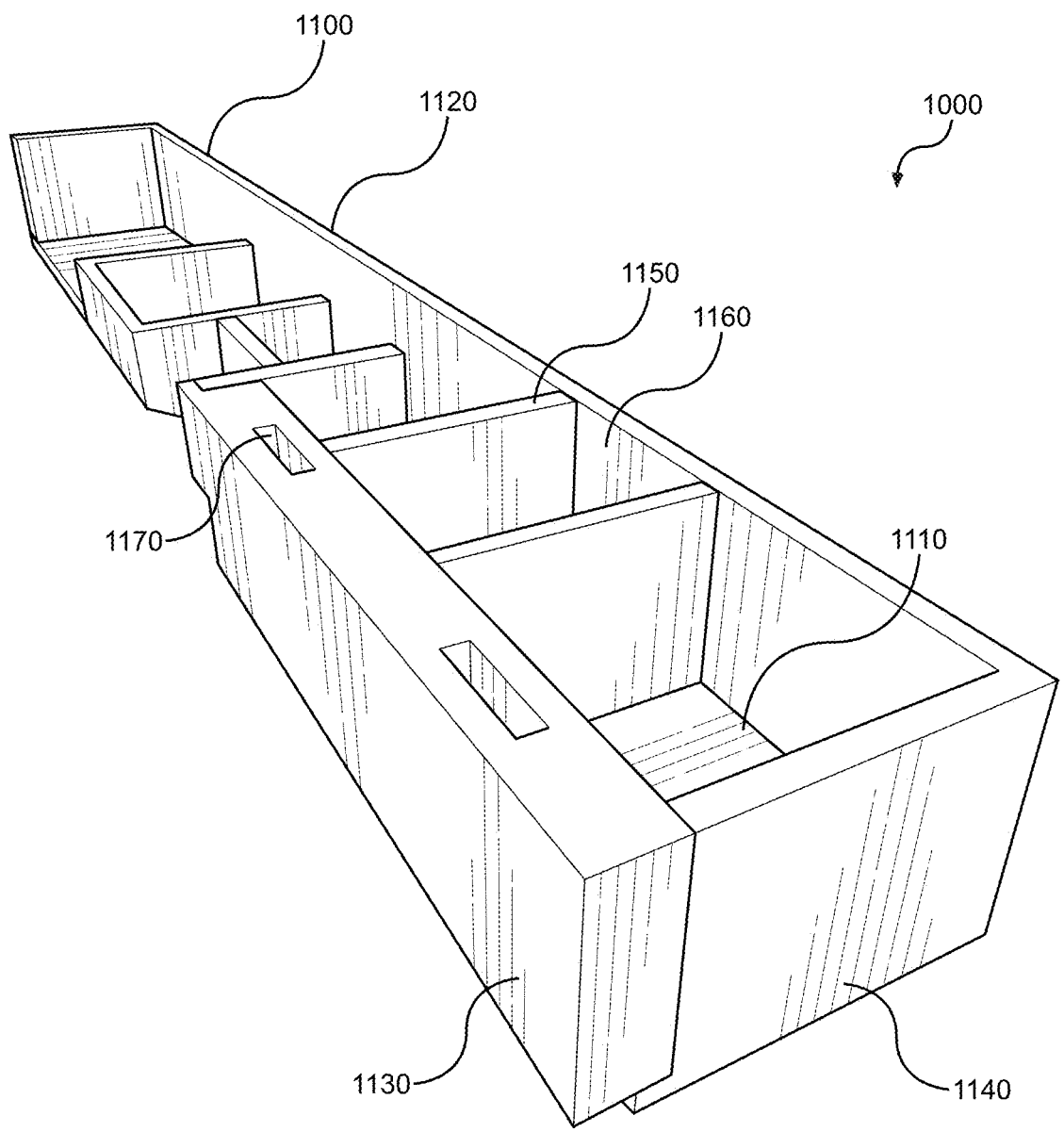
FIG. 1 shows a perspective view of an embodiment of the equipment storage device.

Reference is made herein to the attached drawings. Like reference numerals are used throughout the drawings to depict like or similar elements of the system. For the purpose of presenting a brief and clear description of the present invention, the embodiment discussed will be used for providing an equipment storage device configured to be affixed to a box blade implement of a tractor, thereby enabling convenient and secure transportation of tools and equipment during field operations. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment," "second embodiment," or "third embodiment" does not necessarily refer to the same embodiment.

Referring now to FIG. 1, there is shown a perspective view of an embodiment of the equipment storage device. The equipment storage device 1000 comprises a storage container 1100 having a base panel 1110, a rear wall 1120, a front wall 1130, and a pair of opposing sidewalls 1140 extending therebetween. Together, these panels define a generally rectangular storage volume. Within the storage container 1100 are a plurality of dividing walls 1150, which are oriented vertically and extend between the base panel 1110 and the open upper perimeter of the container 1100.

These dividing walls 1150 define a plurality of internal compartments 1160 configured to receive and organize various pieces of equipment. The dividing walls 1150 may be fixed or removable to accommodate different load sizes and configurations. In some embodiments, one or more internal compartments 1160 comprise a drainage aperture on the base panel 1110 to allow any accumulated liquid to drain from the internal compartment.

The front wall 1130 partially encloses the front end of the container 1100 and comprises a slot in its upper portion to define a channel 1170 extending between an open upper end and the base panel of the storage container. The channel 1170 is configured to receive the blade portion of a chainsaw or other elongated tool therethrough, such that the tool may be stored in a vertical downward-facing orientation. The channel 1170 may be lined with a protective sleeve or insert in alternative embodiments to prevent wear on cutting implements.

Figure 2:
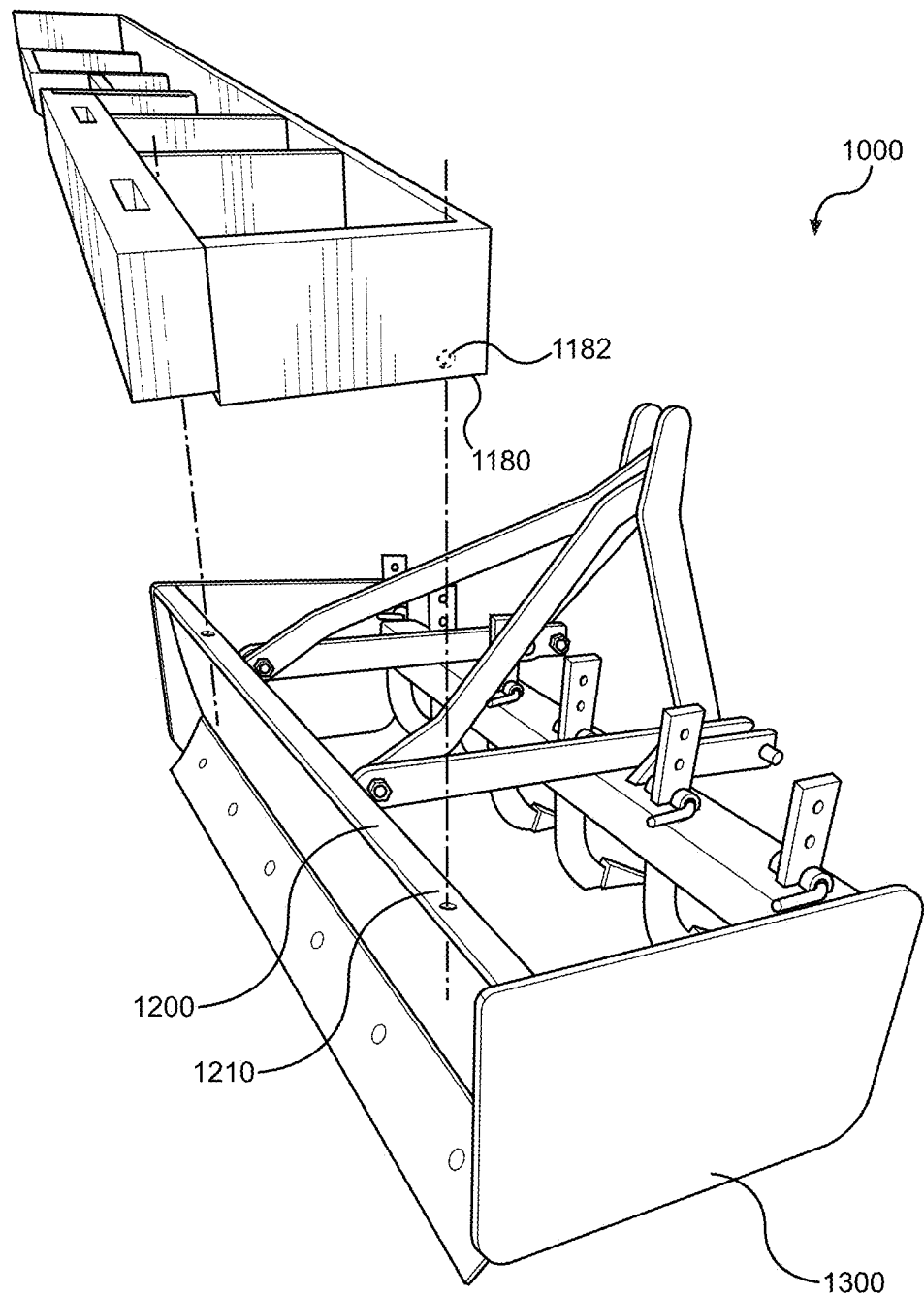
FIG. 2 shows a perspective view of an embodiment of the equipment storage device disposed above a box blade implement.

Referring now to FIG. 2, there is shown a perspective view of an embodiment of the equipment storage device disposed above a box blade implement. The storage container 1100 is mountable to a horizontal surface 1200 of a box blade implement 1300. In the illustrated embodiment, the mounting interface 1180 of the storage container 1100 comprises a plurality of mounting apertures 1182 disposed through the base panel 1110. Bolts, threaded fasteners, or other mechanical fastening elements extend through these apertures and engage corresponding threaded inserts or apertures 1210 on the upper surface 1200 of the box blade implement 1300. This configuration allows the storage container 1100 to be securely affixed and able to withstand vibration and operational forces during tractor use.

In one embodiment, integrated shock-absorbing mounts may be disposed between the base panel 1110 and the upper surface 1200 of the box blade implement 1300. These shock absorbers mitigate the transmission of vibrational energy, thereby protecting sensitive equipment and extending the lifespan of the mounting hardware.

In some configurations, the storage container may further comprise a ballast chamber integrated into the base panel. This chamber may be selectively filled with sand, gravel, or other dense material to act as a counterweight, thereby enhancing tractor stability when lifting heavy front-end loads. This feature eliminates the need for a separate ballast box, combining storage and weight support in a single unit.

Figure 3:
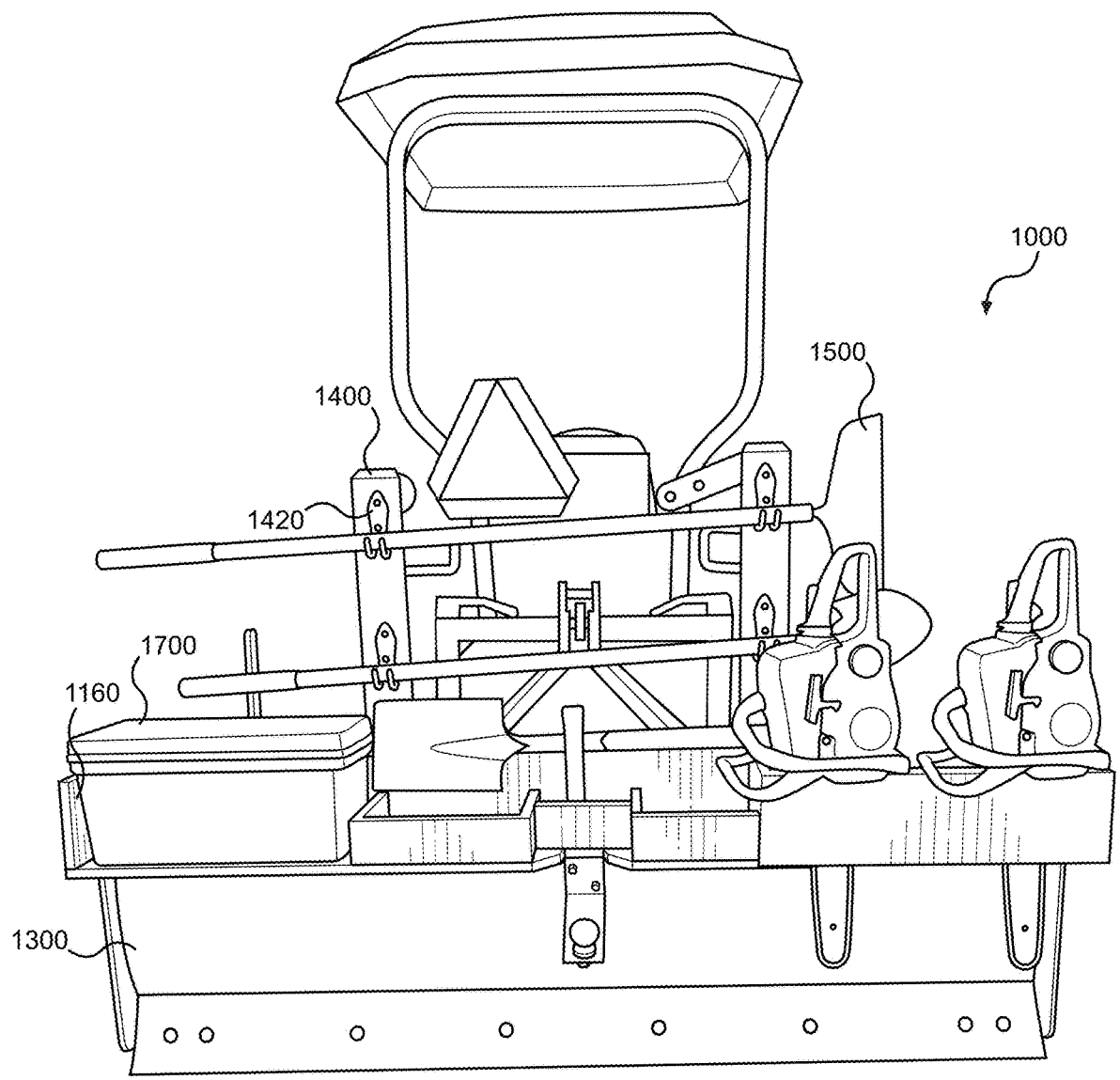
FIG. 3 shows a front view of an embodiment of the equipment storage device secured to a box blade implement.
Figure 4:
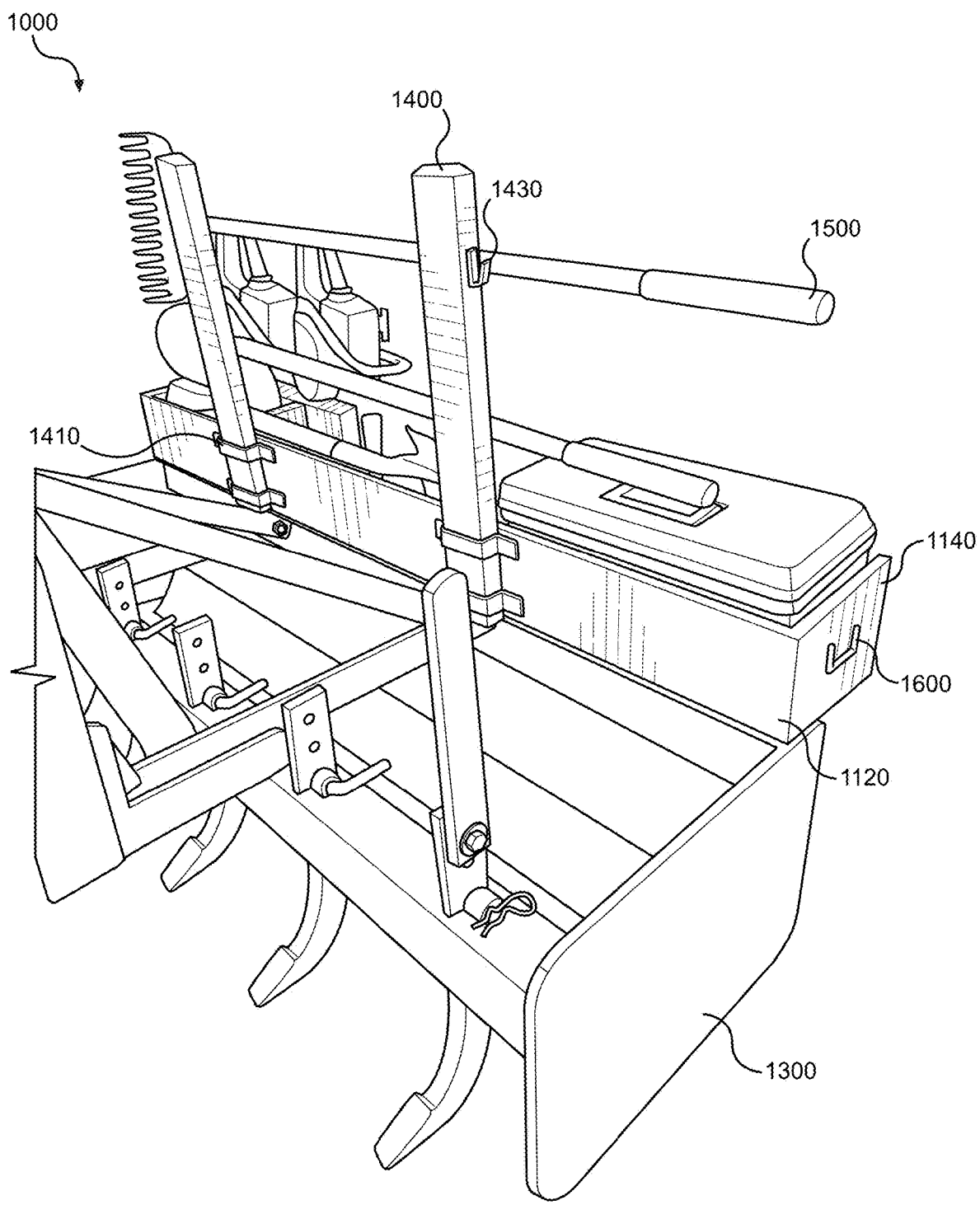
FIG. 4 shows a rear view of an embodiment of the equipment storage device secured to a box blade implement.

Referring now to FIGS. 3 and 4, there is shown a front view and a rear view of an embodiment of the equipment storage device secured to a box blade implement. In the illustrated embodiment, the equipment storage device 1000 further comprises a pair of vertically extending posts 1400 secured to the rear wall 1120 of the storage container 1100 using rear-mounted brackets 1410. Each post 1400 includes one or more post fasteners 1420 for supporting elongated tools 1500 between the pair of posts 1400, such as rakes, shovels, pry bars, or trimmers. In alternative embodiments, the posts 1400 may include secondary fasteners 1430 for carrying additional tools or accessories. These external holders increase the tool-carrying capacity of the device 1000 while preserving the internal compartments for smaller equipment or fuel containers.

Side handles 1600 may be disposed on the sidewalls 1140 of the storage container 1100 to assist in manual lifting and removal when the device 1000 is detached from the box blade implement 1300. The storage container 1100 may also include a tool box 1700 integrated into one of the endmost compartments 1160. In one embodiment, the tool box 1700 is permanently affixed to the container 1100; in others, it may be removable for field servicing.

The device 1000 is constructed from a durable and weather-resistant material such as wood, powder-coated steel, high-density polyethylene, or aluminum. These materials protect against rust, UV degradation, and mechanical damage under prolonged outdoor use. All fasteners are preferably corrosion-resistant and selected based on the expected environmental exposure.

In use, a tractor operator first positions the storage container 1100 atop the box blade implement 1300 and aligns the mounting apertures 1182 with corresponding holes on the implement. Fasteners are inserted and tightened to secure the device 1000 to the upper surface 1200. If included, shock-absorbing mounts 1190 are installed between the contact surfaces prior to tightening.

The user then places the desired tools and equipment into the internal compartments 1160, optionally adjusting or removing dividing walls 1150 as needed. A chainsaw may be inserted vertically through the channel 1170, with its blade resting within the container and its handle exposed above. Elongated tools are mounted to the external posts 1400 and secured using post fasteners 1420 and/or secondary fasteners 1430.

During operation, the storage device 1000 remains secured to the box blade implement 1300 and allows the operator to easily retrieve tools from the rear of the tractor without dismounting or opening other compartments. This configuration reduces unnecessary trips, enhances field efficiency, and supports safe, ergonomic tool access during mobile jobsite work. Alternative embodiments may incorporate modular attachments, additional tool brackets, or insulated compartments, depending on the particular application requirements.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An equipment storage device, comprising:
   a storage container having a base, a rear wall, a front wall spaced apart from the rear wall, and a pair of opposing sidewalls extending between the rear wall and the front wall;
   a plurality of dividing walls disposed within the storage container defining a plurality of internal compartments configured for storing equipment;
   a mounting interface configured to secure the storage container to a mounting surface;
   wherein the front wall partially encloses a front portion of the storage container;
   a channel formed through an upper portion of the front wall and configured to receive a portion of a tool therethrough;
   wherein the mounting surface is an upper surface of a box blade implement configured to attach to a tractor;
   wherein the storage container is designed to be retrofitted to an existing box blade implement without structural modification.

2. The equipment storage device of claim 1, wherein the mounting interface comprises a plurality of bolts extending through mounting apertures on the base of the storage container and into threaded inserts on the box blade implement.

3. The equipment storage device of claim 2, further comprising integrated shock-absorbing mounts between the base of the storage container and the mounting interface to reduce vibration during tractor operation.

4. The equipment storage device of claim 1, wherein the mounting interface includes one or more fasteners selected from bolts, pins, or clamps configured to engage the box blade implement.

5. The equipment storage device of claim 1, wherein the plurality of internal compartments includes removable dividers.

6. The equipment storage device of claim 1, wherein the container is constructed from a weather-resistant material selected from the group consisting of powder-coated steel, high-density polyethylene, or aluminum.

7. The equipment storage device of claim 1, wherein the container includes a ballast chamber selectively fillable with material to serve as a counterweight for stabilizing the tractor during front-end loading operations.

8. The equipment storage device of claim 1, wherein the container includes side handles or handgrips for removal and transport when detached from the box blade implement.

9. The equipment storage device of claim 1, wherein the storage container is mounted on the box blade implement, the box blade implement being configured to attach to a tractor.

10. The equipment storage device of claim 9, further comprising the tractor wherein the storage container is positioned at a height allowing a user to access the plurality of internal compartments from ground level or while standing adjacent a rear of the tractor.

11. The equipment storage device of claim 1, further comprising a pair of posts secured to the rear side of the storage container, wherein each post includes a fastener configured to support an elongated tool therebetween, wherein the elongated tool is configured to be positioned parallel to the base panel of the storage container.

12. The equipment storage device of claim 11, wherein each post is secured to the storage container via a bracket.

13. The equipment storage device of claim 11, wherein the pair of posts further comprises a secondary fastener configured to secure an additional tool.

14. The equipment storage device of claim 1, further comprising a tool box disposed in an end internal compartment of the plurality of internal compartments.

15. The equipment storage device of claim 14, wherein the tool box is permanently secured to the storage container.

16. The equipment storage device of claim 1, wherein the tool is a chainsaw, wherein the channel is configured to receive a blade of the chainsaw therethrough and support the chainsaw in a downward facing position.

17. An equipment storage device, comprising:
a storage container having a base, a rear wall, a front wall spaced apart from the rear wall, and a pair of opposing sidewalls extending between the rear wall and the front wall;
a plurality of dividing walls disposed within the storage container defining a plurality of internal compartments configured for storing equipment;
a mounting interface configured to secure the storage container to a mounting surface;
wherein the front wall partially encloses a front portion of the storage container;
a channel formed through an upper portion of the front wall and configured to receive a portion of a tool therethrough;
a pair of posts secured to the rear side of the storage container, wherein each post includes a fastener configured to support an elongated tool therebetween, wherein the elongated tool is configured to be positioned parallel to the base panel of the storage container.

18. An equipment storage device, comprising:
a storage container having a base, a rear wall, a front wall spaced apart from the rear wall, and a pair of opposing sidewalls extending between the rear wall and the front wall;
a plurality of dividing walls disposed within the storage container defining a plurality of internal compartments configured for storing equipment;
a mounting interface configured to secure the storage container to a mounting surface;
wherein the front wall partially encloses a front portion of the storage container;
a channel formed through an upper portion of the front wall and configured to receive a portion of a tool therethrough;
wherein the tool is a chainsaw, wherein the channel is configured to receive a blade of the chainsaw therethrough and support the chainsaw in a downward facing position.

\* \* \* \* \*